(No Model.) 3 Sheets—Sheet 1.
E. A. NEWMAN.
AUTOMATIC THERMO ELECTRIC CUT-OFF FOR WATER SERVICE SUPPLY PIPES.
No. 389,096. Patented Sept. 4, 1888.
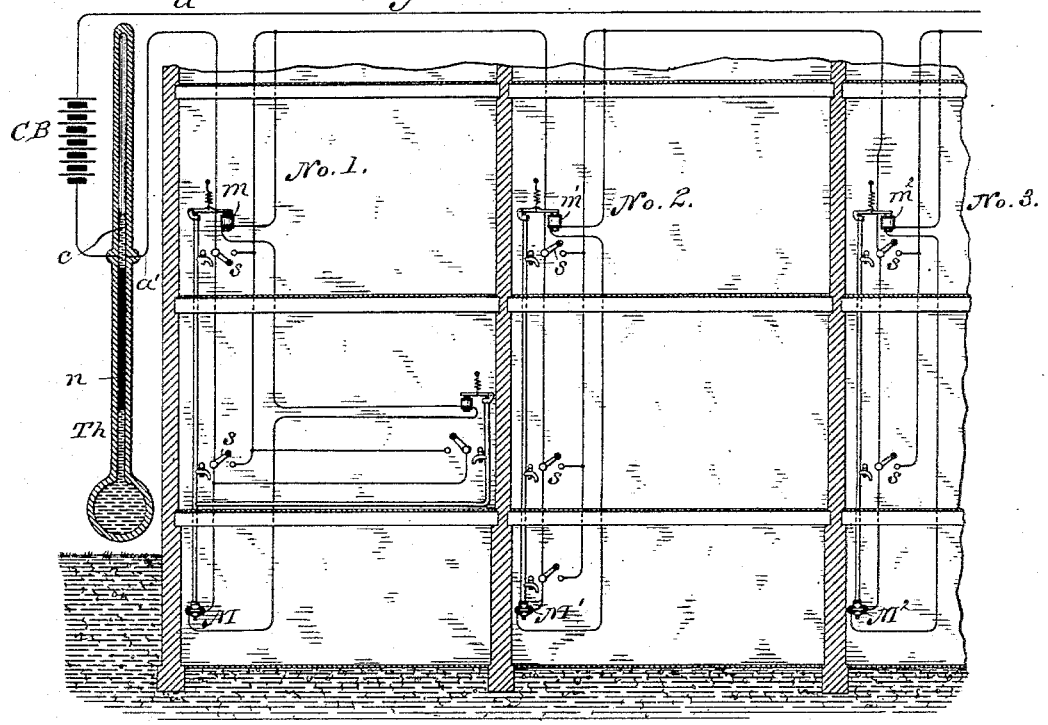
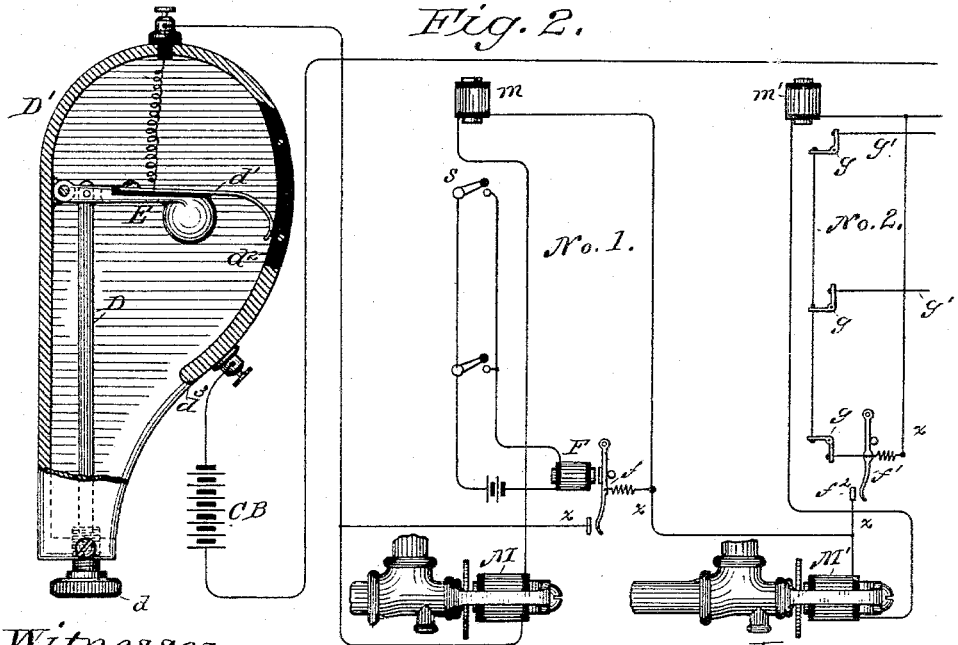
Witnesses
A. C. Newman
C. M. Newman
Inventor,
Edwin A. Newman
By his Attorneys
Baldwin, Hopkins & Payton (No Model.) 3 Sheets—Sheet 2.
E. A. NEWMAN.
AUTOMATIC THERMO ELECTRIC CUT-OFF FOR WATER SERVICE SUPPLY PIPES.
No. 389,096. Patented Sept. 4, 1888.
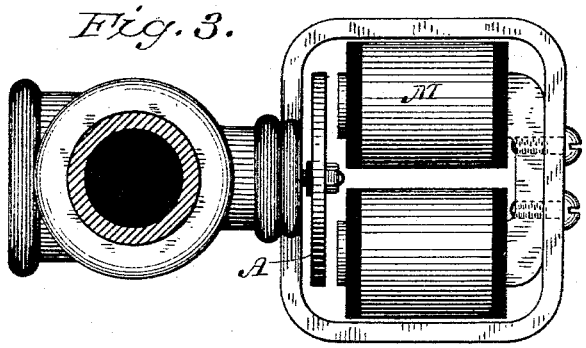
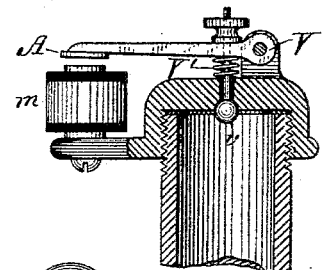
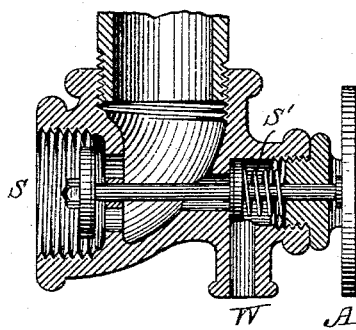
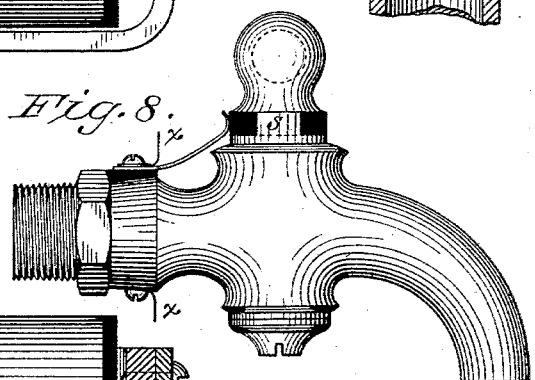
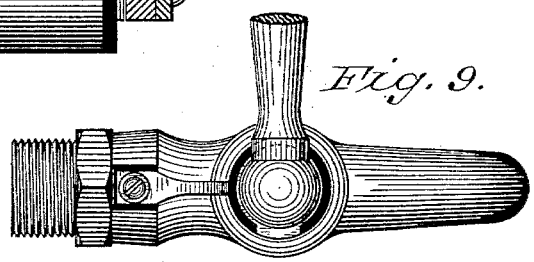
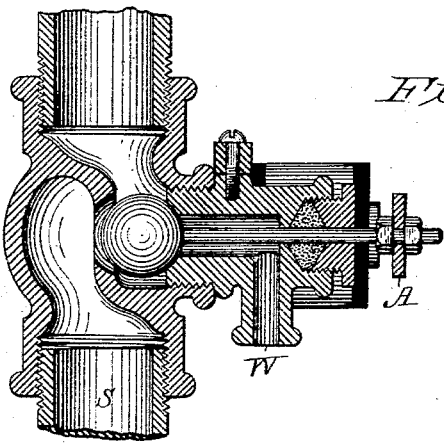
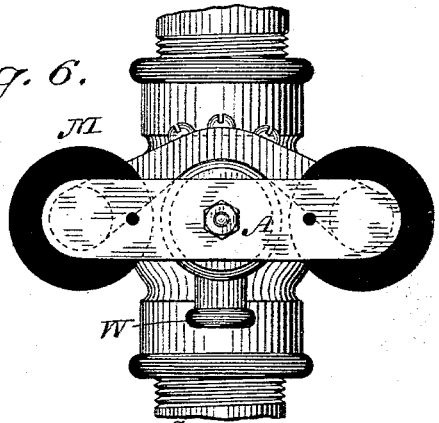
Witnesses,
A. C. Newman.
C. M. Newman.
Inventor,
Edwin A. Newman
By his Attorneys (No Model.) 3 Sheets—Sheet 3.

E. A. NEWMAN.
AUTOMATIC THERMO ELECTRIC CUT-OFF FOR WATER SERVICE SUPPLY PIPES.

No. 389,096. Patented Sept. 4, 1888.

Witnesses,
A. C. Newman,
C. M. Newman.

Inventor,
Edwin A. Newman
By his Attorneys
Baldwin, Hopkins & Peyton.

UNITED STATES PATENT OFFICE.

EDWIN A. NEWMAN, OF WASHINGTON, DISTRICT OF COLUMBIA, ASSIGNOR TO THE NEWMAN ANTI-FREEZING WATER PIPE COMPANY, OF CHICAGO, ILLINOIS.

AUTOMATIC THERMO-ELECTRIC CUT-OFF FOR WATER-SERVICE SUPPLY-PIPES.

SPECIFICATION forming part of Letters Patent No. 389,096, dated September 4, 1888.

Application filed August 7, 1886. Serial No. 210,372. (No model.)

*To all whom it may concern:*

Be it known that I, EDWIN A. NEWMAN, of Washington city, in the District of Columbia, have invented certain new and useful Improvements in Automatic Thermo-Electric Cut-Offs for Water-Service Supply-Pipes, of which the following is a specification.

The object of my invention is to provide for the automatic cut-off of water-supply in buildings when the temperature falls to such a degree that the water in the pipes is liable to become frozen. In my improved organization I employ a thermostatic circuit-completer which controls a cut-off circuit, including suitable electrical appliances.

Figure 10:
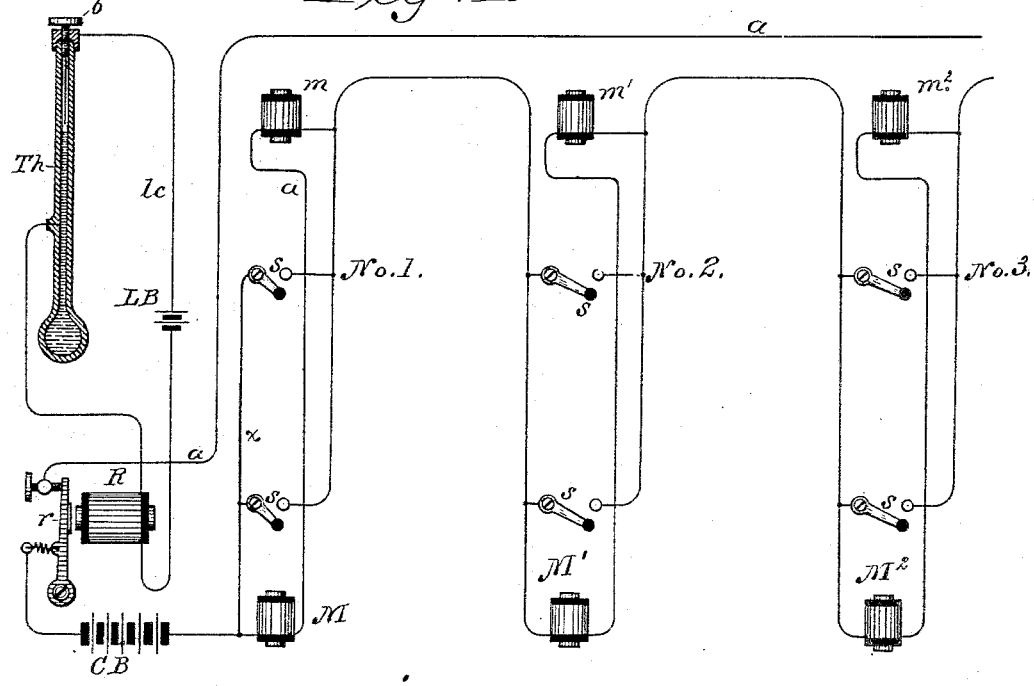
Figure 11:
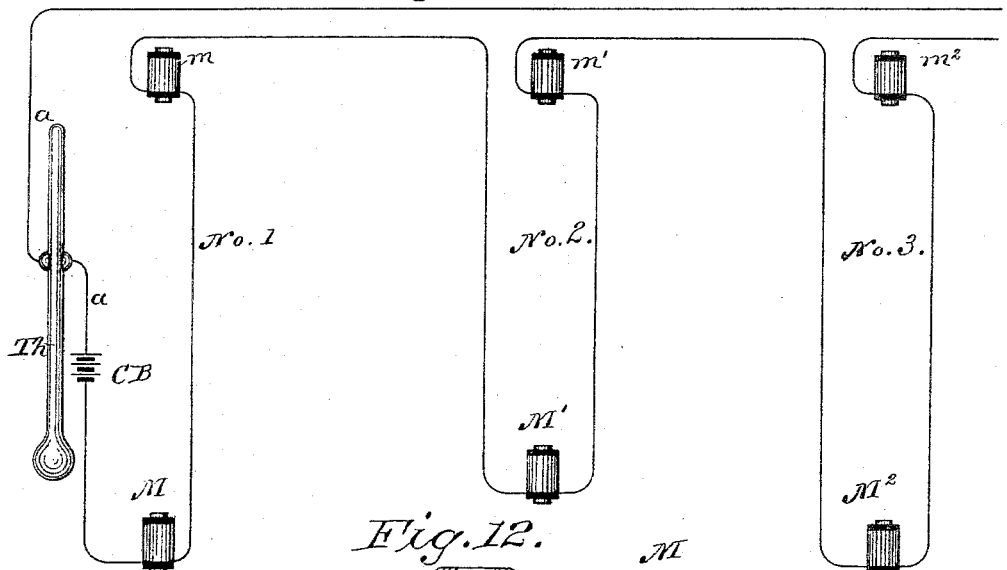

In the accompanying drawings, Figure 1 is a diagram view illustrating three houses with the cut-off apparatus for all the houses connected in one circuit and controlled at a single point by one thermostat. Fig. 2 is a diagram view illustrating a similar arrangement and showing a different form of thermostat. Figs. 3, 4, 5, and 6 are detail views illustrating forms of cut-off valves with suitable electro-magnetic devices for operating them. Fig. 7 is a detail view showing a magnetically-controlled air-valve to be arranged at some point in the upper part of the pipe system of each house for the purpose of admitting air on top of the column of water when the supply-valve is closed and the waste opened for the discharge of water in the pipes. Figs. 8 and 9 are detail views of a faucet having a switch or circuit-completing device connected therewith, so that by the mere turning of the faucet when water is cut off from the pipes a proper circuit will be completed to temporarily turn on the water-supply. Fig. 10 is a diagram view similar to Fig. 1, showing a somewhat different organization; Fig. 11, a similar diagram view showing another organization, and Fig. 12 a detail sectional view of a cut-off valve adapted for use in a normally-open cut-off circuit.

Referring at first especially to Figs. 1 and 10, $Th$ represents a thermostat, which may be of any suitable construction. In Fig. 1 I have illustrated an ordinary thermometer bulb and stem. Upon the mercury in the bulb and lower part of the stem I place some suitable non-conducting fluid, $n$, of a lower specific gravity than the mercury, and on the top of such non-conducting fluid I place suitable conducting-fluid, $c$, of still lower specific gravity.

$CB$ in Fig. 1 represent the battery of the cut-off circuit. A wire, $a$, from one pole of this battery is embedded in the side of the thermostatic tube, so as to present its end to the contact of the conducting-fluid therein. The wire $a$ from the opposite pole of the battery $CB$ is carried to the various cut-off valves under the control of this particular thermostat, and its end $a'$ is finally embedded in the side of the thermostatic tube on the same level as the opposite end of the circuit $a$. The mercury, non-conducting fluid, and upper conducting-fluid of the thermostat are so related to the terminal wires $a$ $a'$ of the cut-off circuit that as long as the temperature of the atmosphere remains within certain degrees the non-conducting fluid will be in contact with the terminals of the circuit. The controlling-circuit will therefore normally be opened and water will flow from the mains to the supply-pipes in the several houses. Should the temperature fall, however, to such a point, previously determined upon, as to bring the upper conducting-fluid in the thermostatic tube in contact with the terminal wires of the cut-off circuit that circuit would be completed and the water-supply valves included in the circuit would all be closed and the waste-connections opened, as presently described.

A preferred arrangement is shown in Fig. 10. There an ordinary mercury bulb and stem are used. In the top of the stem an adjustable circuit-completing contact finger or pin, $b$, extends down into the stem or tube. One terminal of a local circuit, $lc$, in which the local battery $LB$ is included, is connected with this adjustable contact $b$, while the opposite terminal of the circuit may be embedded in the bulb or stem of the thermostat in contact with the mercury therein. This local circuit includes the coils of a magnet, $R$, the armature $r$ of which is normally attracted away from its back-stop $r'$, thus normally opening the cut-off circuit $a$ of the battery $CB$. When the temperature has fallen to a certain degree, however, the mercury in the thermostat leaves the contact-finger $b$, thus opening the local circuit and permitting the armature $r$ to go against its back-stop, thus completing the cut-off circuit and operating all the valves, as presently described.

With the exception above described, Figs. 1 and 10 illustrate the same organization. The circuit-wire from the battery CB runs to a cut-off magnet, M, which operates the cut-off valve of the pipe system No. 1 in any suitable manner, as presently described.

From the magnet M the circuit extends to a magnet, $m$, which operates the air-vent valve, arranged at some point in the upper part of this pipe system, so that when the water-supply is cut-off and the waste-connection opened, as presently described, the vent permits the entrance of air and insures the discharge of the water from the pipes. The circuit is similarly connected with magnets M′ $m$′ M² $m^2$, &c., and is then completed to the opposite pole of the battery CB by way of the wire $a$, back-stop, magnet R, and armature $r$.

Figs. 3, 4, 5, and 6 illustrate suitable cut-off valves which may be used in connection with my invention. In these figures, M represents the magnets shown in the diagram views, which have been described. S is the supply-opening, and W the waste-opening. When the magnet is energized, the armature A on the valve-spindle is attracted, the water-inlet closed, and the waste opened. The valve-spindle may be provided with springs S′, which tend to keep the valves open. Such construction is unnecessary, as upon the demagnetization of the cut-off magnet the pressure of the water will be sufficient to open the valve. The construction is obvious, and more detailed illustration is unnecessary.

The air-valve, which is controlled by the magnet $m$, may be constructed in the manner illustrated in Fig. 7—that is, a pin-ball valve, $v$, carried by pivoted arm V, is normally held closed by a spring, $v'$. When the armature on the end of the lever is attracted, the valve is opened to permit the admission of air.

I have illustrated the valves shown merely for the purpose of exhibiting a practical construction which may be employed in connection with my invention; but obviously any forms of valves capable of being operated or controlled by an electric circuit may be employed. If, when the water-supply is cut off, as above described, it should be desired to draw water in any of the pipe systems 1, 2, or 3, &c., this may readily be done by closing shunt-circuits $x$ around the magnets M $m$ M′ $m'$, &c. For instance, referring to the drawings Figs. 1 and 10, a switch, $s$, may be provided on each floor for closing the shunt $x$. Thus, in the pipe system No. 1 in Fig. 10, if either the upper or lower switch $s$ is closed, a short circuit will be established around the magnets M $m$, they will be demagnetized, and the spring-valves will be thrown open, thus closing the waste and opening the water-inlet. Upon the opening of the switch the water is again cut off.

Instead of employing ordinary switches, such as shown in the diagram views, the switches may be mounted on or form part of the faucet, as illustrated in Fig. 8, in which $xx$ represent the shunt-circuit wires, and $s$ the switch-contact.

In Fig. 2 I have described an arrangement the same as shown in Figs. 1 and 10, but the construction of the thermostat is different. In this figure I have shown the thermostat consisting of an expansible rod, D, of any suitable construction. This rod is inclosed in a suitable jacket or casing, D′, and may be adjusted by means of a nut, $d$, on the lower end thereof. Its upper end is connected with an arm, E, pivoted at one end to the casing D′. Upon the opposite end of the arm E is arranged a suitable contact-finger, $d'$, which works against an insulating-strip of vulcanite or suitable material, $d^2$, secured to the side of the casing D′. One end of the cut-off-circuit wire is connected with the insulated arm $d'$ on the lever E, while the other terminal of said circuit is connected with a metal block, $d^3$, which forms a continuation of the curved insulated strip $d^2$. Upon a sufficient fall of the temperature the contraction of the rod D is such as to complete the circuit of the battery CB through the contact $d^3$ and insulated finger $d'$, thus cutting off the water-supply, as before described.

When it is desired to draw water in any one of the pipe systems, instead of directly establishing the shunt-circuit $x$ by the closing of the switches $s$, as before described, I may place the switches $s$ in a local circuit in which is included the coil of a magnet, F, which, upon the completion of the local by the closing of any one of the switches $s$, attracts the armature-lever $f$, thus completing the shunt-circuit $xx$ through the armature $f$ and short-circuiting the cut-off and air valves of that particular system.

Instead of the arrangement shown in Figs. 1 and 10 for the arrangement of local circuit just described in connection with Fig. 2, I may use ordinary elbow-levers, $g$, which may be actuated from any suitable point by wires $g'$ to draw the lever $f'$ against the contact $f^2$, thus completing the shunt $x$, as shown in Fig. 2.

Figure 12:
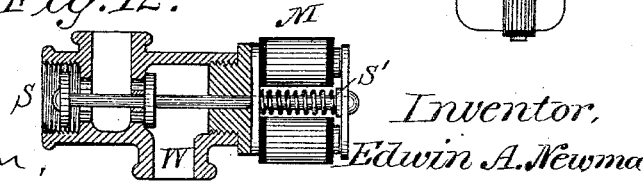

Referring to Figs. 11 and 12, they illustrate an arrangement in which in the normal condition—that is, when the water is turned on—the cut-off circuit is completed. For instance, mercury in the thermostatic tube T$h$ will normally complete the circuit between the terminals $a$ $a$; but upon a fall in temperature the circuit will be opened and the cut-off valves and air-valves automatically operated. With such an arrangement of circuits, of course, the construction of valve would be altered, so that the magnet would normally hold the valve open, and upon the opening of the circuit the valve would be automatically closed by a suitable spring or otherwise. Fig. 12 represents such a construction, and specific description is unnecessary.

It is deemed unnecessary to describe further modifications of my invention, though the details might be modified in other ways without departing from the spirit of my invention.

I claim—

1. The combination of the water supply-pipe system, its inlet-valve and air-valve connected to the upper part of the pipe system, the thermostat, the cut-off circuit controlled by the thermostat, and electro-magnetic devices for controlling the water-inlet and air-valves.

2. The combination of the water-supply system, its inlet-valve, the thermostat, a local circuit in which the thermostat is included, the cut-off circuit in which electro-magnetic devices for controlling the inlet-valve are included, and a magnet in the local circuit for opening and closing the cut-off circuit.

3. The combination of one or more independent pipe systems, their inlet-valves, the cut-off circuit, electro-magnetic devices in the cut-off circuit for controlling said inlet-valves, a thermostat for controlling said circuit, and a shunt-circuit around each inlet-valve, whereby said valve may be short-circuited and water admitted to the particular pipe system.

4. The combination of a water-supply-pipe system, its inlet-valve, the cut-off circuit, electro-magnetic devices in said circuit for controlling the inlet-valve, a thermostat for controlling said circuit, and a shunt or short circuit around the magnetic controlling devices of the inlet-valve.

5. The combination of a pipe system, its inlet-valve, electro-magnetic devices for controlling said valve, an electric circuit in which said magnetic devices are included, a thermostat for controlling said circuit, a shunt or short circuit around the magnetic devices of the inlet-valve, and a faucet of the pipe system having switch devices included in said shunt-circuit, which are automatically operated upon the turning of the faucet.

6. The combination, with a pipe or conduit having an outlet faucet or cock, of an automatically-controlled cut-off valve or cock for shutting off the flow of liquid to the pipe, one or more thermostats placed, as described, so as to be affected by changes of temperature affecting the contents of the pipe, and a controlling device placed at or near the outlet faucet or cock and within the control of the operator for permitting the control of the cut-off valve independently of the condition of the thermostat or thermostats.

7. The combination, with a section of pipe, of an electrically-controlled drain cock or faucet placed between said section of pipe and the main, one or more thermostats placed in proximity to the section of pipe, as described, and adjusted to be called into action on a determinate change of temperature, and an automatic valve for admitting air to the pipe when the drain cock or faucet is opened.

In testimony whereof I have hereunto subscribed my name.

EDWIN A. NEWMAN.

Witnesses:
 JOS. R. EDSON,
 JOS. FORREST.